Dec. 21, 1948.　　　　　R. L. MERKER　　　　　2,456,642
GREASE COMPOSITION
Filed Aug. 13, 1946.
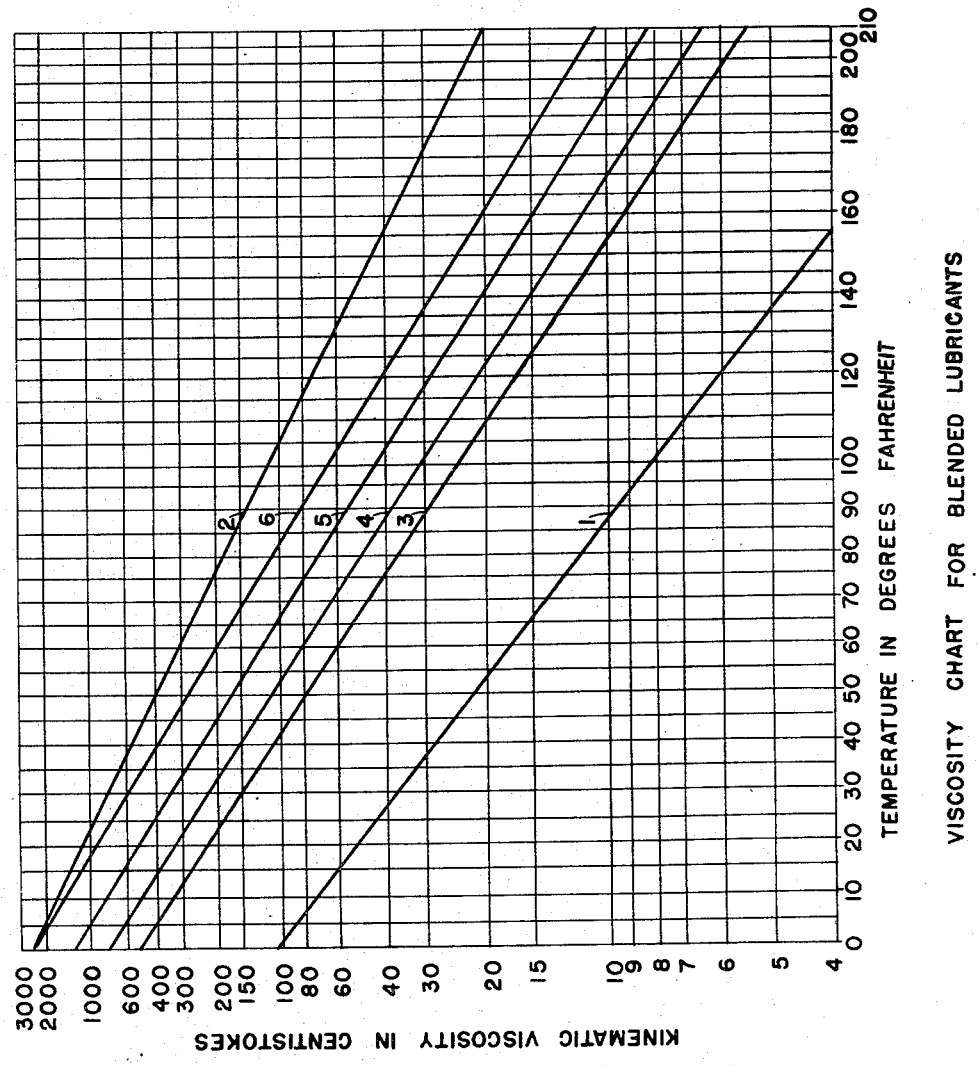
Inventor
ROBERT L. MERKER Patented Dec. 21, 1948

2,456,642

UNITED STATES PATENT OFFICE 2,456,642

GREASE COMPOSITION

Robert L. Merker, United States Navy

Application August 13, 1946, Serial No. 690,195

11 Claims. (Cl. 252—42.1)

(Granted under the act of March 3, 1883, as amended April 30, 1928; 370 O. G. 757)

My invention relates to grease compositions and particularly to grease compositions utilizing blended silicone-diester fluids as bases.

The resistance of silicones to oxidation and ignition would seem to make their employment in the art of manufacturing grease decidedly advantageous over the use of the conventional, purely hydrocarbon, fluid bases. However, their uses in this field have heretofore been necessarily limited by their very nature in resisting the incorporation of important additives. Such additives include oxidation, corrosion, and rust inhibitors, polymers, and thickeners such as metallic soaps. The incompatibility of silicone fluids and the soaps necessary to thicken them to a grease consistency tends to cause excessive bleeding or separation when silicone greases are used, and the methods for successfully blending these components, because of the inherent incompatibility of silicones and soaps, are necessarily intricate and expensive. The tendency of silicones to seize, rather than to lubricate certain metal on metal surfaces, has been another severe limitation in their applicability to high speed and high temperature operation. Thus, the striking properties of this family of compounds have not been utilized in grease compositions to the fullest extent.

It is a fundamental object of my invention to obviate some of these difficulties and extend the usefulness of silicones in the art of grease manufacture.

It is another object of my invention to provide a grease composition in which the base fluid, comprising a blend of major portions of a silicone and a diester, renders the thickeners and other commonly used additives readily soluble in the fluid.

It is another object of my invention to provide a grease composition which is characterized by the silicone-diester blend as a base and a very high viscosity stability over a wide range of temperatures.

It is a further object of my invention to provide a silicone-diester grease composition which is extremely resistant to oxidation.

It is a further object of my invention to provide a silicone-diester grease composition suitable for use in delicate instruments, in high-speed, high-temperature operations, and in general purpose lubrication.

Another object of my invention is to provide a method for producing silicone greases.

Other objects and advantages of my invention will in part be obvious and in part appear hereinafter.

My invention accordingly comprises metal soap greases utilizing silicone-diester blends as base fluids, said greases possessing the characteristics, properties, and the relation of components which will be exemplified in the detailed description hereinafter set forth. The scope of the invention will be indicated by the claims.

I have discovered that by combining silicones and liquid diesters of dicarboxylic and hydroxy acids, the resulting fluid blends possess substantially all of the desirable properties of the silicone fluids and the diester fluids while the undesirable qualities of the silicones are substantially eliminated. These fluid lubricants comprising blends of silicones and diesters form the subject matter of my copending application Serial Number 690,194, filed of even date herewith.

Using such blended base fluids I have discovered further that highly stable greases may be simply and economically produced and consistently reproduced. The grease compositions of my invention display good oxidation resistance, good lubricating quality, easy compatibility with soap thickeners and various oxidation and rust inhibiting additives.

According to my invention, any liquid diesters, preferably those which have boiling points about 150° C., may be used in combination with the desired silicone to prepare the base fluid. Generally diesters of dicarboxylic acids having 4 or more carbon atoms in the chain are preferred. Among the aliphatic esters are straight or branched-chain alkyl diesters of aliphatic dicarboxylic acids such as diethyl adipate, di-2-ethylhexyl adipate, diethyl pimelate, ditetradecyl sebacate, di-2-ethylhexyl sebacate, and others. Mixed aliphatic-aromatic diesters are those such as methyl phthalyl ethyl glycolate, and aromatic diesters are those such as diethyl phthalate, dibutyl phthalate, di-2-ethylhexyl phthalate, and the like.

The organo-silicon polymers or polysiloxanes to be incorporated in the base fluid of my invention may be any of those which are soluble in the desired diester liquid. Among these are alkyl, aryl, alkaryl, aralkyl straight and branched chain silicone polymers, such as dimethyl, diethyl, ethylmethyl, diphenyl, ditolyl, phenyl-tolyl, phenyl-methyl, ethyl-phenyl silicones and others which conform to the general structure

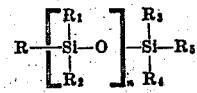

where R, $R_1$, $R_2$, $R_3$, $R_4$ and $R_5$ can be alike or different and may be any of the above mentioned radicals, and n may be any whole number greater that 1. Cross-linked silicone polymers may be used equally well provided they are compatible with the chosen diester fluid over the temperature range in which the composition is to be used. Silicone fluids available commercially are generally assigned a formula like that sketched, but it is understood in the art that a given fluid may contain chain compounds having the Si-O linkage and many cross-linked and divided elements.

Metallic salts of fatty acids having from 10 to 20 carbon atoms in the aliphatic chain are used as the metal soap thickeners in my invention. Metals such as aluminum, lead, zinc, and magnesium, alkali metals such as lithium, sodium, and potassium, and alkaline earth metals such as calcium, barium, and strontium are most frequently used, although metals such as copper, manganese, mercury, bismuth, chromium, iron, cobalt, nickel may be used.

In addition to the soap thickeners added, various balancing ingredients such as oxidation, rust, and corrosion inhibitors, polymer thickeners, extreme pressure additives, and the like as exemplified by:

Polymer thickeners:
  Polymethyl methacrylate
  Polybutene
Anti-oxidants:
  4-tertiary-2-phenyl phenol
  Diphenyl amine
Rust inhibitors:
  Zinc naphthenate
  Barium mahogany sulfonate
  Sorbitan monooleate
Anti-wear additives:
  Tricresylphosphate may be incorporated with the base fluid, as conditions of operations dictate. Total balancing ingredients will be less than 3 per cent by weight of the composition.

The base fluid lubricant of my invention comprises essentially a blend of between about 5 and 95 per cent by weight of silicone polymer and between about 5 and 95 per cent by weight of liquid diester.

In order to illustrate that the combination of a silicone polymer and a diester fluid in the proportions defined preserves the desirable properties of the silicone, masks undesirable ones, and incorporates desirable properties of the ester, a series of base fluid lubricants were prepared and tested. Typical test data are shown in Table I and illustrated by curves in the appended figure.

Specific fluid blends were prepared from varying proportions of polymethylphenylsiloxane, (aromatic-aliphatic ration—.51) and di-2-ethylhexyl adipate. When an oxidation inhibitor was used, 4-tertiary butyl-2-phenyl phenol was chosen. The polymer thickener when used was a polymethyl methacrylate.

The particular components of any one mixture were heated together with stirring to about 350° F. to 400° F. to insure the attainment of complete solution.

TABLE I

| Reference to Figure | Kinematic Viscosities in Centistokes | | | ASTM Slope 0°–210° F. | Viscosity index |
| --- | --- | --- | --- | --- | --- |
| | 0° F. | 100° F. | 210° F. | | |
| Curve 1 | 107 | 8.22 | 2.38 | 0.765 | 121 |
| Curve 2 | 2628 | 96.86 | 21.96 | 0.484 | 155 |
| Curve 3 | 550.1 | 22.57 | 5.425 | 0.665 | 170 |
| Curve 4 | 827.3 | 29.30 | 6.716 | 0.635 | 165 |
| Curve 5 | 1386 | 39.70 | 8.706 | 0.603 | 160 |
| Curve 6 | 2610 | 59.27 | 12.29 | 0.587 | 155 |

Referring to the figure, curves are plotted, according to the ASTM requirements, of the kinematic viscosities in centistokes as a function of temperature. The slopes of these curves indicate the viscosity stability of the fluid.

Curve 1 represents the characteristics of the pure diester and is given as a basis for comparison with the other curves;

Curve 2 represents the characteristics of a fluid lubricant consisting of 71.8 parts silicone, 20 parts diester, 8 parts polymethyl methacrylate, and 0.2 part oxidation inhibitor;

Curve 3 represents the characteristics of a fluid lubricant consisting of 69.8 parts silicone, 30 parts diester, and 0.2 part oxidation inhibitor;

Curve 4 represents the characteristics of a fluid lubricant consisting of 79.8 parts silicone, 20 parts diester, and 0.2 part oxidation inhibitor;

Curve 5 represents the characteristics of a fluid lubricant consisting of 89.8 parts silicone, 10 parts diester, and 0.2 part oxidation inhibitor;

Curve 6 represents the characteristics of the pure liquid silicone and is given as a basis for comparison with the other curves.

It will be noted that curves 3, 4, and 5 possess substantially the same slope as curve 6, indicating that the desirable viscosity properties of the silicone are maintained in the blended silicone-diester liquids. Curve 2 shows an improvement in the viscosity characteristics of the prepared lubricant over the pure silicone of curve 6. It is seen that the viscosity slopes of the prepared lubricants are real improvements over the viscosity of the pure diester in curve 1.

To illustrate the degree of compatibility of the base fluid blends with the various additives, all of the compound fluid lubricants of silicone-diester composition were stored at minus 40° F. for 10 days with no separation of phases resulting therefrom. Although the properties of a specific silicone-diester combination were summarized in the figure, it is to be understood that the invention is not limited to the specific example, but that the example is merely an illustration of one of its preferred embodiments.

The grease compositions of my invention consist essentially of such blended silicone-diester base fluids as described above having dispersed therein between about 5 to about 30 per cent by weight of metal soap thickener.

The following examples will serve to illustrate the ease of preparation and the properties obtainable from the blending of the above-described components in varying parts by weight.

EXAMPLE I

A base fluid lubricant was prepared by mixing together 60.8 parts of poylmethylphanylsiloxane (aromatic-aliphatic ratio—.51) having a viscosity of about 50 centistokes at 25° C., 25 parts of di-2-ethylhexyl adipate, 1.0 part of polymethyl-methacrylate, and 0.2 part of 4-tertiary butyl-2-phenyl phenol and heating with stirring to about 400° F. Thirteen (13) parts of lithium stearate was added to this hot base fluid and the mixture was stirred until a clear solution resulted. This solution was then cooled rapidly to form a gel, which gel was worked about ten times through a 70 x 80 mesh screen to produce a grease of uniform consistency.

The grease had an ASTM penetration at 77° F. of 224. After being forced through a 400 mesh screen 100 times, the penetration had increased to only 237. After 500 hours at 210° F. in the Norma-Hoffman Oxidation Test, a drop from 110 pounds per square inch to 108.5 pounds per square inch in oxygen pressure indicates the high degree of oxidation resistance of this grease. After 50 hours at 212° F. the grease which had been forced through the 400 mesh screen 100 times showed bleeding of only 7.0 per cent and evaporation of only 0.31 per cent.

This grease exhibits excellent lubricating qualities over a temperature range from 40° F. to about 300° F. in high speed lubricating applications.

EXAMPLE II

A base fluid lubricant was prepared by mixing 65 parts of polymethylphenylsiloxane (aromatic-aliphatic ratio—.51) having a viscosity of about 50 centistokes at 25° C., and 25 parts of di-2-ethylhexyl adipate as in Example I. Ten (10) parts of lithium stearate was added and a grease prepared as described in Example I. It will be noted that this composition differs from that of Example I in the omission of balancing ingredients. This example is given to emphasize the fact that balancing ingredients may be used as in Example I to improve specific properties of a grease without detrimentally effecting its primary chemical and lubricating qualities.

This grease had an ASTM penetration at 77° F. of 240, and after 50 hours at 212° F. the grease which had been forced through a 400 mesh screen 100 times showed bleeding of only 3.6 per cent and evaporation of only 0.54 per cent.

EXAMPLE III

Twenty-three (23) parts of polymethylphenylsiloxane (aromatic-aliphatic ratio—.51) having a viscosity of about 50 centistokes at 25° C., 66 parts of di-2-ethylhexyl sebacate, and 11 parts of lithium stearate were used to prepare a grease as in Example I.

This grease had an ASTM penetration at 77° F. of 231 and after 50 hours at 212° F. showed bleeding of only 4.6 per cent and evaporation of only 0.47 per cent. Balancing ingredients to enhance specific lubricating or load carrying qualities of the grease may be incorporated in this composition, as in any other grease of the type involved in this invention, without materially changing these fundamental qualities. This grease is a highly effective lubricant over a temperature range from about —50° F. to about 300° F. and is characterized by its extremely low starting-torque properties.

EXAMPLE IV

Sixty-two (62) parts of polymethylsiloxane having a viscosity of about 5 centistokes at 25°C., 25 parts of di-2-ethylhexyl sebacate, and 13 parts of lithium stearate were used to prepare a grease as in Example I. This grease gave an ASTM penetration at 77° F. of 254, and after being forced through a 250 mesh screen 100 times, the penetration was only 263. After 50 hours at 212° F. the grease showed bleeding of only 2.3 per cent and evaporation of only 0.52 per cent.

This grease is especially adapted to use in delicate instruments by virture of its low starting-torque properties. It is an effective lubricant over a temperature range from about —125° F. to about 200° F.

EXAMPLE V

Forty-five (45) parts of polymethylphenylsiloxane (aromatic-aliphatic ratio—.51) having a viscosity of about 50 centistokes at 25° C., 45 parts of di-tetradecyl sebacate, and 10 parts of lithium stearate were used to prepare a grease as in Example I.

This grease gave an ASTM penetartion at 77° F. of 239, and after 50 hours at 212° F. showed bleeding of only 6.3 per cent and evaporation of only 0.70 per cent.

In the preceding examples for purposes of illustration, I have described the preparation and qualities of various lithium soap greases. The examples to follow are to illustrate that the practice of my invention is just as readily applicable to the preparation of other metal soap greases which, because of their individual characteristics, are utilized for specific lubricating functions. The general properties and applications to which each type of metal soap grease is preferentially adapted is well known in the lubricating art and forms no part of the present invention. It is to be noted that the characteristics which are directly contributed by the type of metal soap used in the preparation of greases are not changed, but that the properties of the grease contributed by the base fluid are definitely improved.

Example VI

Fifty-seven (57) parts of polymethylphenylsiloxane (aromatic-aliphatic ratio—.51) having a viscosity of about 50 centistokes at 25° C., 25 parts of di-2-ethylhexyl sebacate, and 18 parts of aluminum stearate were used to prepare a grease in the manner described in Example I.

This grease had a penetration of 270 at 77° F.

Example VII

A grease of the following composition was prepared as in Example I: 66 parts of polymethylphenylsiloxane (aromatic-aliphatic ratio—.51) having a viscosity of about 100 centistokes at 25° C.; 20 parts of di-2-ethylhexyl azelate; and 14 parts of strontium palmitate. The penetration measured at 77° F. was 235.

For purposes of illustration, I have described in general terms in Example I a method whereby the grease compositions of my invention may be produced. That is to say, the various ingredients may be heated together with stirring until a clear solution is obtained, which solution is suddenly chilled to ambient temperature to produce a composition have a grease structure. This method has proved successful in all cases. However, in order to produce a grease composition having essentially a silicone fluid as its base, that is, a silicone grease, I have discovered the following method.

The thickening soap is first dispersed in the silicone fluid where it is maintained in suspension by a suitable stirring or mixing means. The suspension is heated to a solvation temperature of the soap, which temperature is determined empirically and is dependent upon the type and quantity of ingredients being processed. At this solvation temperature, which in general will be within the range of 250° F. to 400° F., a diester fluid is added to the system in an amount just sufficient to dissolve the soap and produce a clear hot solution. Upon sudden chilling of the hot solution to ambient temperature, a grease is produced which is essentially a silicone base grease.

It should be noted that my invention is not limited to the use of liquid silicones in the preparation of the base fluid lubricants. I have used ester-soluble solid polymers of silicones, such as polymethylphenylsiloxane resins, in preparing excellent greases having properties similar to those illustrated in the above examples.

A typical example of a grease composition prepared from this type of base fluid is as follows: 9 parts by weight of a solid polymeric silicone such as polymethylphenylsiloxane resin, 76 parts by weight of di-2-ethylhexyl adipate, and 15 parts by weight of lithium stearate. The method of compounding the grease is the same as that hereinbefore described. The ASTM penetration of 77° F. after forcing the grease through 70 x 80 mesh screen eleven times was 233. This grease is well adapted to fine instrument operation because of its low starting-torque properties.

According to my invention, many superior greases can be prepared from mixtures of diesters and silicones thickened with various metal soaps. These greases have remarkable oxidation stability, low bleeding and evaporation rates, high shear stability, and are water-resistant and heat stable. High temperature greases operating at temperatures up to 300° F. and low temperature greases operating as low as —100° F. can be prepared by varying the type of silicone and the diester used. They can be prepared more cheaply and more easily than greases made from a silicone fluid alone without sacrificing any of the desirable silicone-imparted operating characteristics.

Since many modifications may be made in my invention without departing from the scope thereof, it is to be understood that this invention is not restricted to the present disclosure otherwise than defined by the appended claims.

The invention described herein may be manufactured and used by or for the Government of the United States of America for governmental purposes without the payment of any royalties thereon or therefor.

What is claimed is:

1. A grease composition compatible with the addition of relatively small proportions of polymer thickeners, oxidation, rust and corrosion inhibitors and extreme pressure additives comprising, 5 to 30 parts by weight of a metallic soap and 95 to 70 parts of a fluid blend of between about 5 and about 95 parts by weight of a diester of a dicarboxylic acid and between about 95 and 5 parts by weight of a silicone.

2. A grease composition comprising 5 to 30 parts by weight of a metallic soap and 95 to 70 parts by weight of a fluid blend of between about 5 and about 95 parts by weight of a diester of a dicarboxylic acid and between about 95 and about 5 parts by weight of a dimethyl silicone, said base fluid component having dissolved therein less than 3 parts by weight of a mixture of a polymer thickener, oxidation, rust and corrosion inhibtors and extreme pressure additives.

3. A grease composition comprising, 5 to 30 parts by weight of a metallic soap of a fatty acid dispersed in a base fluid as a thickener therefor, said base fluid comprising a blend of 5 to 95 parts by weight of a diester of dicarboxylic acid and 95 to 5 parts by weight of a slicone, and said base fluid having dissolved therein approximately 3 parts by weight of a mixture of oxidation and rust inhibitors and extreme pressure and anti-wear additives.

4. A grease composition compatible with the addition of relatively small proportions of polymer thickeners, oxidation, rust and corrosion inhibitors and extreme pressure additives, comprising 5 to 30 parts by weight of a lithium soap of a saturated fatty acid and 95 to 70 parts by weight of a base fluid component, said acid having from at least 10 to about 20 carbon atoms in the aliphatic chain and said base fluid component comprising a blend of 5 to 95 parts by weight of a diester of a dicarboxylic acid and 95 to 5 parts by weight of phenyl-methyl silicone.

5. A grease composition comprising, from about 5 to about 30 parts by weight of a metallic soap of a saturated aliphatic acid and from about 95 to about 70 parts by weight of a base fluid component, said acid having from at least 10 to about 20 carbon atoms in the aliphatic chain, said base fluid comprising a mixture of from about 5 to about 95 parts by weight of a diester of a dicarboxylic acid, and from about 95 to about 5 parts by weight of a silicone, and said base fluid component having dissolved therein less than about 1 part by weight of 4-tertiary butyl-2-phenyl phenol.

6. A grease composition comprising, 5 parts by weight of lithium stearate, 27 parts by weight of a dimethyl silicone, 65 parts by weight of di-2-ethyl hexyl adipate, 2 parts by weight of 4-tertiary butyl-2-phenyl phenol, and 1 part by weight of polymethyl methacrylate.

7. A grease composition comprising, 27 parts by weight of lithium stearate, 23 parts by weight of a polyphenyl-methyl silicone, 50 parts by weight of di-2-ethylhexyl sebacate.

8. A grease composition comprising, 13 parts by weight of lithium stearate, 62 parts by weight of a dimethyl silicone, and 25 parts by weight di-2-ethylhexyl azelate.

9. The method of producing a silicone grease which comprises, maintaining a dispersion of metal soap particles in a silicone fluid, heating said dispersion to about the solvation temperature of said soap, adding a diester of a dicarboxylic acid to said dispersion at said solvation temperature in an amount sufficient to cause said soap to go into solution and chilling said solution rapidly to ambient temperature.

10. The method of producing a silicone grease which comprises, maintaining a dispersion of a metal soap in a phenyl-methyl silicone, heating said disperison to the solvation temperature of said soap, which temperature lies within the range of 200° F. to 500° F., adding a diester of a dicarboxylic acid to said dispersion at said solvation temperature in an amount sufficient to cause said soap to go into solution, and chilling said solution rapidly to ambient temperature.

11. In the method of producing a silicone grease which is compatible with the addition thereto of relatively small proportions of polymer thickeners, oxidation, rust and corrosion inhibitors and extreme pressure additives, the steps of dissolving from about 95 to about 5 parts by weight of a polymethylphenyl-siloxane with from about 5 to about 95 parts by weight of a di-ester of a dicarboxylic acid, heating the solution so formed to a temperature of about 400° F., adding from 5 to 30 parts of a metallic soap of a fatty acid to from 95 to 70 parts by weight of the solution, stirring the resulting solution of the soap until clear and rapidly cooling the said resulting solution to form a gel and grease of uniform consistency.

ROBERT L. MERKER.

REFERENCES CITED

The following references are of record in the file of this patent:

UNITED STATES PATENTS

| Number | Name | Date |
|---|---|---|
| 1,993,738 | Graves et al. | Mar. 12, 1935 |
| 2,049,072 | Mikeska et al. | July 28, 1937 |
| 2,104,408 | Wiezevich | Jan. 4, 1938 |
| 2,406,971 | Sowa | Sept. 3, 1946 |
| 2,407,037 | Sowa | Sept. 3, 1946 |
| 2,410,346 | Hyde | Oct. 29, 1946 |